Patented Feb. 22, 1927.

1,618,172

UNITED STATES PATENT OFFICE.

MOSES L. CROSSLEY, OF SOMERVILLE, NEW JERSEY, ASSIGNOR TO THE CALCO CHEMICAL COMPANY, OF BOUNDBROOK, NEW JERSEY, A CORPORATION OF NEW JERSEY.

SALT OF A QUINOLIN CARBOXYLIC ACID AND PROCESS OF PRODUCING THE SAME.

No Drawing. Application filed September 20, 1924. Serial No. 738,912.

This invention relates generally to a salt of a quinolin carboxylic acid and the process of preparing same, and more particularly to a metallic salt of an aryl quinolin carboxylic acid, as the magnesium salt of such organic compound. The particular salt to which this invention has especial reference is the magnesium salt of -2-phenylquinolin-4-carboxylic acid, or cinchophen. The anhydrous form of such salt has the structural formula:

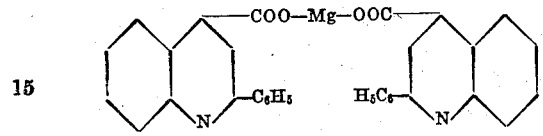

and in the hydrated forms the formulæ:

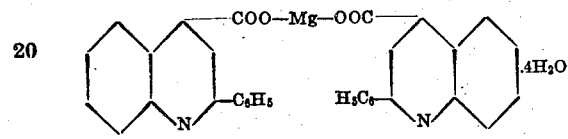

and

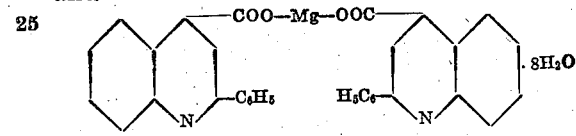

This new product may be prepared by treating an aryl phenylquinolin carboxylic acid with a magnesium compound in either an aqueous or an alcoholic solution. The method for producing such new product in which an aqueous medium is used is as follows:

50 parts of pure 2-phenylquinolin-4-carboxylic acid are warmed with a mixture of 10 parts of magnesium oxide and 1000 parts of water and the mixture stirred thoroughly for several hours. The supernatant liquor is decanted off through a filter and the solid residue again treated with hot water and filtered. The lixiviation is continued until nothing further is extracted. The combined liquor is then concentrated to about one-fifth of its original volume and allowed to cool. The salt crystallizes as hydrates containing 4 and 8 molecules of water of crystallization. When heated these hydrates lose water and the anhydrous salt results. The first crop of crystals represents about 85 per cent of the weight of the acid taken. The mother liquor is worked up to recover the salt it contains either as such or as the acid. The salt is washed with water and dried.

The process wherein an alcoholic medium is utilized is as follows:

100 parts of 2-phenylquinolin-4-carboxylic acid are mixed with 12 parts of magnesium oxide and 400 parts of 50 per cent ethyl alcohol. The mass is warmed to bring about solution. The solution is then concentrated and the magnesium salt crystallized out.

The resulting magnesium salt of 2-phenylquinolin-4-carboxylic acid when anhydrous is yellow in color and has a slightly bitter taste. It forms hydrates containing 4 and 8 molecules of water respectively. The hydrate with 4 molecules of water separates from aqueous solution best above 80° C. From a supersaturated solution the hydrate containing 8 molecules of water separates best at temperatures below 80° C. This hydrate melts in hot water at about 68° C., passing over into the hydrate containing 4 molecules of water, which then precipitates.

This new organic compound salt is soluble in water and certain organic solvents, such as alcohols, for example: methyl alcohol, ethyl alcohol, propyl alcohol; acetone, methyl acetate, aniline, and nitrobenzene.

The novel product has pronounced therapeutic properties, and is effective in the treatment of gout, rheumatic fever and kindred ailments.

Having thus described the invention, what I claim as new and desire to secure by Letters Patent of the United States is:

1. As a new product, a magnesium salt of 2-phenylquinolin-4-carboxylic acid.

2. As a new product, a magnesium salt of 2-phenylquinolin-4-carboxylic acid containing not less than four molecules of water of crystallization.

3. As a new product, a magnesium salt of 2-phenylquinolin-4-carboxylic acid containing not more than eight molecules of water of crystallization.

4. As a new product, a magnesium salt of 2-phenylquinolin-4-carboxylic acid containing not less than four and not more than eight molecules of water of crystallization.

In testimony whereof I have signed the foregoing specification.

MOSES L. CROSSLEY.